United States Patent Office 3,300,411
Patented Jan. 24, 1967

3,300,411
FLUXES FOR SINTERING LITHIUM FERRITES
Donald G. Wickham, Santa Monica, and Ho Bin Im, Los Angeles, Calif., assignors to Ampex Corporation, Culver City, Calif., a corporation of California
No Drawing. Filed Feb. 21, 1964, Ser. No. 346,399
5 Claims. (Cl. 252—62.5)

This invention relates to improved lithium ferrites. More particularly, the invention relates to a method for improving lithium ferrites utilizing fluxes to promote sintering.

Ferromagnetic materials have found particular application in computer memory construction. More specifically, ferromagnetic materials of the ferrite type are widely used in the manufacture of magnetic memory cores. Materials such as ceramic lithium ferrite have unusually good properties for such applications. Lithium ferrite has what may be considered a square hysteresis loop characteristic in that it can be switched between opposite stable magnetic states by a current pulse of sufficient amplitude, when used as a core in a memory device. The required switching amplitude of the pulse is dependent upon the coercivity of the material. Lithium ferrite has a small temperature coefficient of coercivity as one of its more important properties. This enables the device in which the core is utilized to be subjected to wide ranges of temperatures without the coercivity being greatly affected. Despite the low temperature coefficient of coercivity, lithium ferrite has been limited in use previously because its value of coercivity is relatively high as compared to other commonly used ferrite materials. Temperatures in excess of 2100° F. would be required to fire the ceramic lithium ferrite in order to produce a sufficiently dense material which would have a coercivity comparable to other ferrites. Below 2100° F. the grain growth of the ceramic does not proceed to make the material as dense as required. At 2100° F. or above however, rapid evaporation of the lithium transpires which obviously changes the composition. With the resultant loss of lithium, the square loop characteristic of the material is greatly decreased. Additionally, there is a lack of uniformity among the cores produced, from one batch to another. Core specifications become difficult to meet and often cannot be reached at such high temperatures.

It is an object of this invention to provide a method of making lithium ferrite and the composition resulting therefrom with a low value of coercivity.

Another object of the invention is to provide a method of making lithium ferrite and the composition resulting therefrom without utilizing a firing temperature above 2000° F.

Still another object of the invention is to provide a method for making lithium ferrite having a low value of coercivity without greatly affecting the temperature coefficient of coercivity of the material.

These and other objects of the invention are accomplished by the utilization of lithium vanadates as fluxes to lower the firing temperatures of lithium ferrite and causes densification thereof. In the method of this invention, the lithium vanadates are intimately mixed with the lithium composition prior to fiiring, whereby a resultant final composition has the firing chemical formula

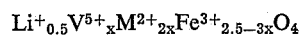

wherein M represents at least one divalent cation usually found in spinel ferrites and is selected from the class consisting of Mg, Mn, Fe, Co, Ni, Cu, and Zn and $x$ does not exceed .05. Preferably, $x$ is within the range of .005 to .025. The metal cation M is provided so that a correct balance of the valences is present in the resultant material. It is necessitated by the presence of the vanadium which has the 5+ valence. The lithium vanadates or other vanadate hydrates can be utilized as fluxes in this invention. Lithium vanadates which can be used include, but are not limited to, lithium orthovanadate, $Li_3VO_4$; metavanadate $LiVO_3$; pyrovanadate $Li_4V_2O_7$; oxyorthovanadate $Li_2O \cdot 2Li_3VO_4 \cdot H_2O$. The orthovanadate hydrates include $Li_3VO_4 \cdot 8H_2O$ and $Li_3VO_4 \cdot H_2O$.

Prior to this invention, vanadium pentoxide $V_2O_5$, had been used as a flux to improve the properties of Ni–Zn ferrites and magnesium ferrites. In order to act as a flux without deleteriously affecting the resultant material, vanadium pentoxide was required in very small quantities. As a result, it was difficult to thoroughly mix with the bulk of material and could not adequately perform its function as a flux. The lithium vanadates of this invention have many advantages over the vanadium pentoxide previously utilized. They are generally of lower density than the vanadium pentoxide and therefore occupy greater volume per the vanadium atom and are more easily mixed. Additionally, some of the lithium vanadates such as $Li_3VO_4$, $Li_4VO_2O_7$ have higher melting points than vanadium pentoxide and fluxing action is more easily controlled. It is believed that the invention will be better understood from the following detailed explanation and examples.

EXAMPLE I

A composition containing vanadium in accordance with the chemical formula $Li^{+}_{0.5}V^{5+}_xM^{2+}_{2x}Fe^{3+}_{2.5-3x}O_4$, as previously set forth was prepared. The value of $x$ was chosen to equal .01. The constituents used to make the material were carefully weighed out and then placed in a ball mill for grinding. The compounds utilized included 0.235 mole (17.36 g.) of lithium carbonate, $Li_2CO_3$; 0.01 mole (1.358 g.) of lithium orthovanadate, $Li_3VO_4$; 0.02 mole (1.49 g.) of nickel oxide and 1.235 moles (197.2 g.) of ferric oxide, $Fe_2O_3$. A grinding medium was chosen in which all the foregoing constituents were insoluble. Isopropyl alcohol was utilized for this purpose. The mixture was then milled for eight hours. The resultant slurry was removed from the mill and dried. It was then sieved and reacted at a temperature of 1400° F. for approximately one and one-half hours. The material was ground again in a ball mill and the resultant slurry was dried and sieved. It was then prepared for pressing by the addition of a binder and lubricant. A polyvinyl alcohol, known as Elvanol and made by Du Pont Company, was added in the amount of 2½ weight percent to serve as the binder. The lubricant consisted of ½ weight percent stearic acid.

Cores of desired size were pressed from the material including the binder and lubricant and finally sintered. Samples were made at sintering temperatures within a range of 1800–1950° F. so as to obtain the effect of the range of temperature on the resultant products. This temperature was found to be lower than that required for materials containing no lithium vanadate which required at least 2100° F.

In the method of making lithium ferrites in accordance with this invention, the starting compounds, other than the fluxes, may be any that will form an oxide of the metal upon heating. Thus, for example, oxalates, nitrates, hydroxides, and carbonates of lithium, and the divalent metal cation are contemplated.

In the preparation of the cores in accordance with the above example, the amount and type of binders and lubricants utilized are well known in the art. Any suitable compounds will serve. The weight percent of the materials will increase with sibe of the cores being made. Some compounds can serve the dual purpose of lubricant and binder, such as Carbowax.

EXAMPLE II

The above example was repeated utilizing varying values of $x$ in the above formula of the invention so that differing amounts of the lithium vanadate flux were present. Results indicating the performance of the compounds of this invention as compared to a compound wherein no flux is utilized is indicated in Table I below.

In the Table I, $H_c$ represents the coercivity; $I_b/I_w$ is the maximum disturb ratio wherein $I_b$ is the maximum amplitude of a disturb pulse; $I_w$ is the amplitude of the full-write pulse; $\mu V_1$ is the undisturbed "one" output voltage; $dV_z$ is the disturbed "zero" response voltage; $t_s$ is the switching time in microseconds and the temperature range in ° C. represents the useful temperature range for the core. The core utilized had an outside diameter of 0.050 inch and an inside diameter of 0.030 inch and was 0.015 inch in height. The rise time $t_r$ of the current pulses were 0.5 microsecond. The temperautre was 25° C.

Table I
PROPERTIES OF $Li_{0.5}V_xM_{2x}Fe_{2.5-3x}O_4$ MEMORY CORES (25° C.)

|  | $x=0$ | $x=0.01$ | $x=0.014$ | $x=0.02$ |
|---|---|---|---|---|
| Firing temp. (° F.) | 2,000 | 1,950 | 1,950 | 1,900 |
| $H_c$ (amp.-turns) | 1.7 | 0.95 | 0.80 | 0.70 |
| $I_b/I_w$ | $\frac{1.12}{1.70}=0.66$ | $\frac{0.640}{0.950}=0.68$ | $\frac{0.520}{0.800}=0.65$ | $\frac{0.440}{0.700}=0.63$ |
| $\mu V_1$ (mv.) | 80 | 80 | 70 | 60 |
| $dV_z$ (mv.) | 7 | 4 | 5 | 5.5 |
| $t_s$ (μsec.) | 1.05 | 1.05 | 1.05 | 1.05 |
| Temp. range (° C.) | −25 to 125 | −50 to 125 | −50 to 100 | −50 to 75 |

A most important factor, as seen from the above table, is that without the presence of the vanadate flux of the invention, the coercivity of the lithium ferrite was extremely high at a level of 1.7, indicating an excessive amount of current would be necessary to operate the core. This value was substantially reduced, due to the utilization of the flux, to a value of less than one-half where $x$ equals 0.2. To attempt to lower the coercivity of the core in the column, where $x$ equals 0, in other words where no flux is present, the firing temperature would of necessity have to be raised above 2100° F. As previously indicated, it is quite detrimental, causing vaporization of lithium, producing unpredictable cores having poor properties.

In addition, it is noted from the above table that with the presence of the lithium vanadate fluxes in accordance with this invention, the disturbed zero response voltage, $dV_c$, was substantially reduced, indicating better performance for the compounds of the invention. It is noted that nickel was the metal atom utilized in the compounds. As previously indicated, any of the other metal atoms found in pure spinel ferrites would produce successful results. Equally successful results are obtained when utilizing any of the other lithium vanadates or orthovanadate hydrates previously described as fluxes in accordance with the procedure of Example I.

EXAMPLE III

To further indicate the outstanding properties of the invention, additional smaller cores were prepared and tested. The cores had an outside diameter of 0.030 inch and inside diameter of 0.020 inch and were 0.007 inch high. The changes of the properties of the cores with temperatures under typical operating conditions are listed in the following Table II. The composition of the cores was $Li_{0.5}V_{0.01}Ni_{0.02}Fe_{2.47}O_4$.

Table II

| Temp. (° C.) | $dV_1$ (mv.) | $dV_z$ (mv.) | $t_s$ (μsec.) | $I_b$ (ma.) | $I_b/I_w$ |
|---|---|---|---|---|---|
| −50 | 24 | 2.7 | 0.63 | 550 | 0.76 |
| −25 | 30 | 2.7 | 0.62 | 530 | 0.73 |
| 0 | 35 | 2.6 | 0.61 | 510 | 0.704 |
| +25 | 39 | 2.6 | 0.60 | 490 | 0.675 |
| +50 | 42 | 2.5 | 0.59 | 470 | 0.650 |
| +75 | 45 | 2.5 | 0.58 | 450 | 0.620 |
| +100 | 48 | 2.5 | 0.57 | 430 | 0.593 |
| +125 | 51 | 2.5 | 0.56 | 410 | 0.565 |

Firing temperature 1,900° F.
$I_{partial\ write}/I_{full\ write}=363$ ma./725 ma.
$t_r=0.2$ μ sec.

It should be particularly noted that over the wide temperature range of −50 to +125° C. the disturbed output voltage, $dV_1$, about doubled indicating the extreme value of the compound of the invention over such temperature ranges. This is a most critical factor to observe in performance of the cores. The remaining properties of the cores, as can be seen from the tables, remained essentially constant over the wide temperature range, further indicating their particular usefulness.

There has accordingly been described herein a novel, useful method and means for making improved lithium ferrite material.

What is claimed is:

1. In the method of making lithium ferrites which includes the steps of milling compounds of iron and lithium capable of forming an oxide upon heating, mixing said compounds with binders and lubricants, pressing said mixed compounds into a desired shape, and heating said pressed compounds to a temperature sufficient to produce said lithium ferrites, the improvement comprising mixing with conventional lithium ferrite starting compounds, a flux selected from the class consisting of lithium vanadates and lithium orthovanadate hydrates.

2. The improvement of claim 1 wherein the lithium vanadate is lithium orthovanadate.

3. In the method of making lithium ferrites which includes the steps of milling compounds of iron and lithium capable of forming an oxide upon heating, mixing said compounds with binders and lubricants, pressing said mixed compounds into a desired shape, and heating said pressed compounds to a temperature sufficient to produce said lithium ferrite, the improvement which comprises milling with said starting compounds a flux selected from the class consisting of lithium vanadates and lithium orthovanadate hydrates, whereby the temperature required to form said lithium ferrite is less than 2000° F.

4. The method of claim 3 additionally comprising milling with the starting materials a divalent metal cation compound capable of forming an oxide upon heating.

5. The method of claim 3 wherein said flux is lithium orthovanadate.

References Cited by the Examiner

UNITED STATES PATENTS

| 2,744,873 | 5/1956 | Piekarski | 252—62.5 |
| 3,093,588 | 6/1963 | Brown | 252—62.5 |
| 3,208,948 | 9/1965 | Blasse | 252—62.5 |

HELEN M. McCARTHY, *Acting Primary Examiner.*

TOBIAS E. LEVOW, *Examiner.*

R. D. EDMONDS, *Assistant Examiner.*